(12) United States Patent
Nozaki (10) Patent No.: US 11,044,389 B2
(45) Date of Patent: Jun. 22, 2021

(54) IMAGE PICKUP DEVICE

(71) Applicant: CANON KABUSHIKI KAISHA, Tokyo (JP)

(72) Inventor: Kosuke Nozaki, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/563,694

(22) Filed: Sep. 6, 2019

(65) Prior Publication Data
US 2020/0092450 A1 Mar. 19, 2020

(30) Foreign Application Priority Data

Sep. 19, 2018 (JP) .............................. JP2018-174917
May 14, 2019 (JP) .............................. JP2019-091386

(51) Int. Cl.
| | |
|---|---|
| *H04N 5/225* | (2006.01) |
| *G02B 7/00* | (2021.01) |
| *G03B 11/00* | (2021.01) |
| *H04N 5/232* | (2006.01) |
| *G02B 5/20* | (2006.01) |

(52) U.S. Cl.
CPC ........... *H04N 5/2254* (2013.01); *G02B 5/208* (2013.01); *G02B 7/006* (2013.01); *G03B 11/00* (2013.01); *H04N 5/2253* (2013.01); *H04N 5/232* (2013.01)

(58) Field of Classification Search
CPC .... H04N 5/232; H04N 5/2253; H04N 5/2254; H04N 5/2328; H04N 5/23287; G03B 11/00; G03B 17/14; G03B 2205/0007; G03B 2205/0038; G02B 5/208; G02B 7/006
See application file for complete search history.

(56) References Cited

U.S. PATENT DOCUMENTS

| | | | | |
|---|---|---|---|---|
| 5,453,784 A | * | 9/1995 | Krishnan | H04N 5/23212 348/348 |
| 6,072,529 A | * | 6/2000 | Mutze | H04N 5/232 348/351 |
| 8,670,069 B2 | * | 3/2014 | Sjoberg | H04N 5/2253 348/374 |
| 2010/0128129 A1 | * | 5/2010 | Kim | H04N 5/23245 348/164 |
| 2011/0058804 A1 | * | 3/2011 | Ito | H04N 5/2254 396/439 |

(Continued)

FOREIGN PATENT DOCUMENTS

| | | |
|---|---|---|
| CN | 1910905 A | 2/2007 |
| CN | 101178469 A | 5/2008 |

(Continued)

*Primary Examiner* — Lin Ye
*Assistant Examiner* — Chriss S Yoder, III
(74) *Attorney, Agent, or Firm* — Canon U.S.A., Inc. IP Division (57) ABSTRACT

An image pickup device of the present invention includes an image pickup element, an image pickup element holder that supports the image pickup element and is rotationally movable with respect to a plane orthogonal to an optical axis of an image pickup lens, an optical filter, and an optical filter holder that extractably supports the optical filter onto the optical axis of the image pickup lens. The optical filter holder rotationally moves along with a rotational movement of the image pickup element holder in an identical direction.

8 Claims, 7 Drawing Sheets

(56) References Cited

U.S. PATENT DOCUMENTS

| | | | |
|---|---|---|---|
| 2012/0194728 A1* | 8/2012 | Kim | G02B 5/208 348/342 |
| 2015/0054919 A1 | 2/2015 | Kim et al. | |

FOREIGN PATENT DOCUMENTS

| | | |
|---|---|---|
| CN | 102012611 A | 4/2011 |
| CN | 102819168 A | 12/2012 |
| JP | 2011-61371 A | 3/2011 |

\* cited by examiner

IMAGE PICKUP DEVICE

BACKGROUND OF THE INVENTION

Field of the Invention

The present invention relates to an image pickup device including an optical filter.

Description of the Related Art

In a monitoring camera such as a network camera, an incident light which has passed through a lens unit forms an image on an image pickup element, and thus a camera unit can acquire the image. In general, the acquired image is in a satisfactory imaging state when an object in a depth of field is imaged, but is in a degraded imaging state when an object outside the depth of field is imaged. For example, in a monitoring application, in a case where a criminal person is present in a range where an imaging state of an object is not satisfactory, the object cannot be recognized in some cases. Although the depth of field can be increased by closing down an aperture, a quantity of light that can be captured becomes small.

A technique that increases the depth of field in a full aperture state includes a tilt technique that relatively tilts a lens and an image pickup element to increase the depth of field.

Most of monitoring cameras include an optical filter that cuts light in an infrared region in order to acquire a satisfactory image in bright daytime. In monitoring in nighttime and a dark place where a lot of light is desired to be captured, the monitoring camera generally captures light in the infrared region with the optical filter, which is extractable, being retracted. The optical filter is normally disposed near the image pickup element.

Japanese Patent Application Laid-Open No. 2011-61371 discusses an image pickup device including a tilt adjustment mechanism that adjusts a tilt angle and an optical filter insertion and extraction mechanism that is movable in a direction orthogonal to an optical axis and has an infrared cut filter and a dummy glass plate.

However, as described in Japanese Patent Application Laid-Open No. 2011-61371, in a configuration including both the tilt mechanism of the image pickup element and the optical filter insertion and extraction mechanism, in a case where the image pickup element is to be rotationally moved so that the tilt angle of the image pickup element is adjusted, the optical filter insertion and extraction mechanism occasionally prevents the rotational movement. Thus, a tilt amount might not be sufficiently secured.

SUMMARY OF THE INVENTION

The present invention is directed to an image pickup device that can sufficiently secure a tilt amount of an image pickup element in a configuration having a tilt mechanism of the image pickup element and an optical filter insertion and extraction mechanism.

An image pickup device of the present invention includes an image pickup element, an image pickup element holder configured to support the image pickup element, the image pickup element holder being rotationally movable with respect to a plane orthogonal to an optical axis of an image pickup lens, an optical filter, and an optical filter holder configured to extractably support the optical filter onto the optical axis of the image pickup lens. The optical filter holder rotationally moves along with a rotational movement of the image pickup element holder in an identical direction.

Further features of the present invention will become apparent from the following description of exemplary embodiments with reference to the attached drawings.

DESCRIPTION OF THE EMBODIMENTS

Exemplary embodiments of the present invention will be described in detail below with reference to the attached drawings.

Figure 1A:
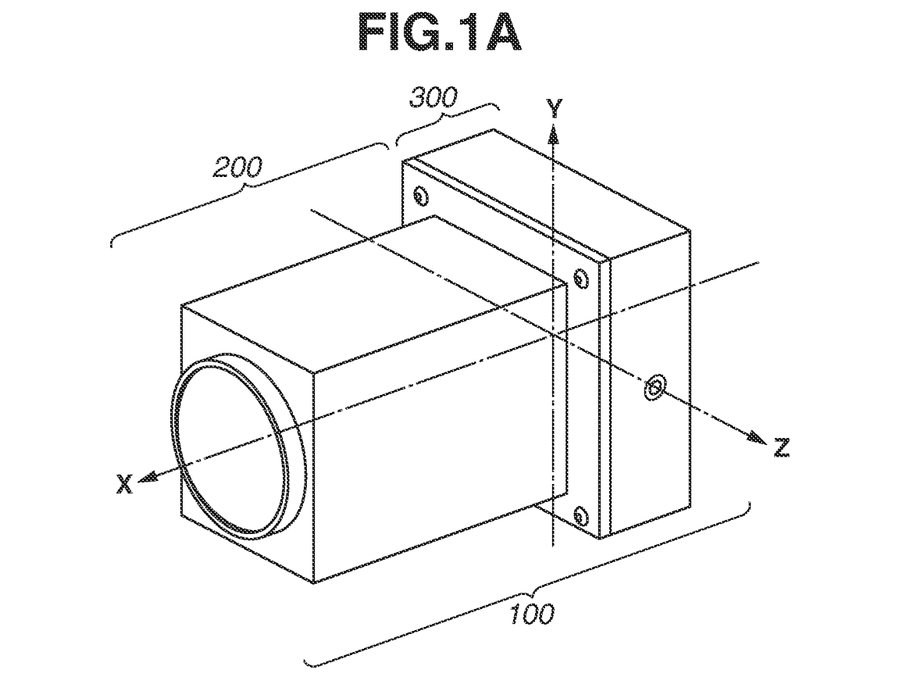
FIGS. 1A and 1B are a perspective view of a monitoring camera according to a first exemplary embodiment, and a cross-sectional view of the monitoring camera according to the first exemplary embodiment, respectively.
Figure 1B:
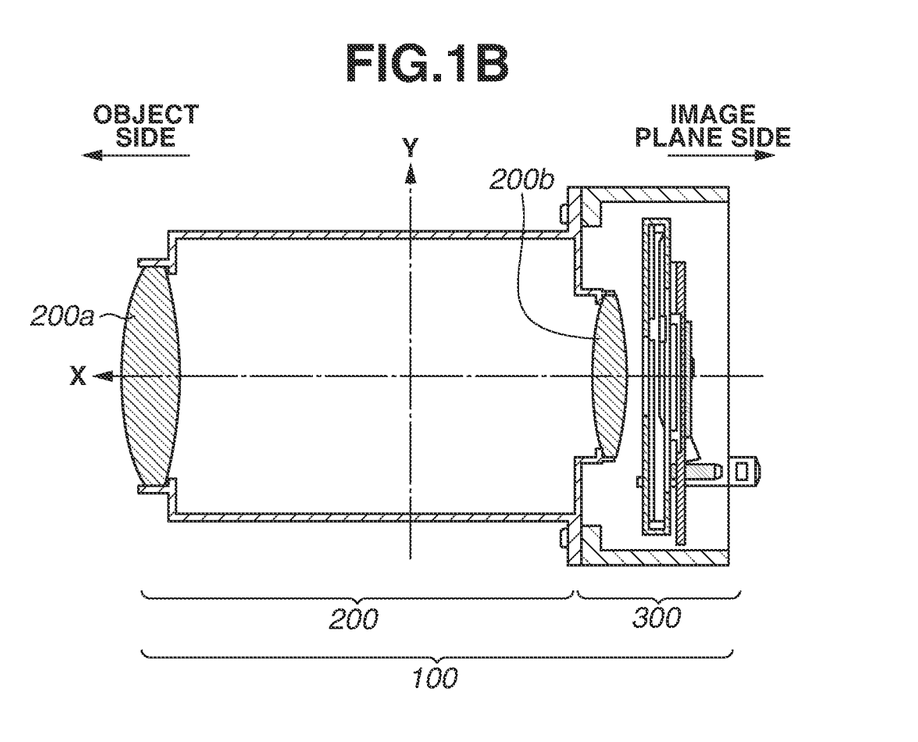
Figure 2A:
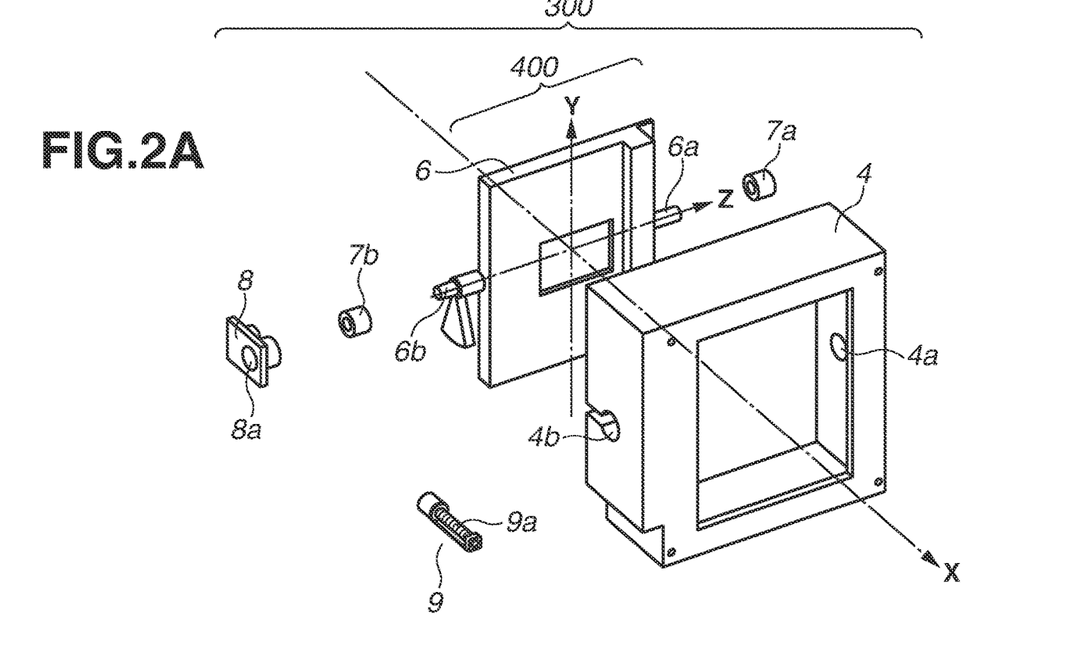
FIGS. 2A and 2B are exploded perspective views of a camera main body according to the first exemplary embodiment.
Figure 2B:
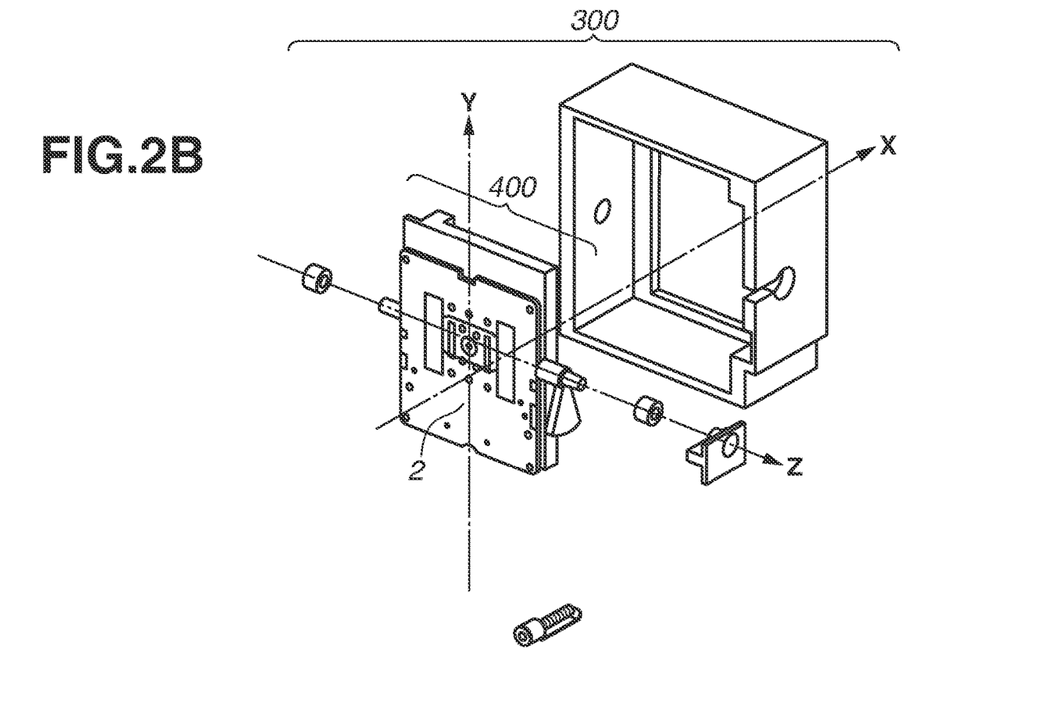
Figure 3:
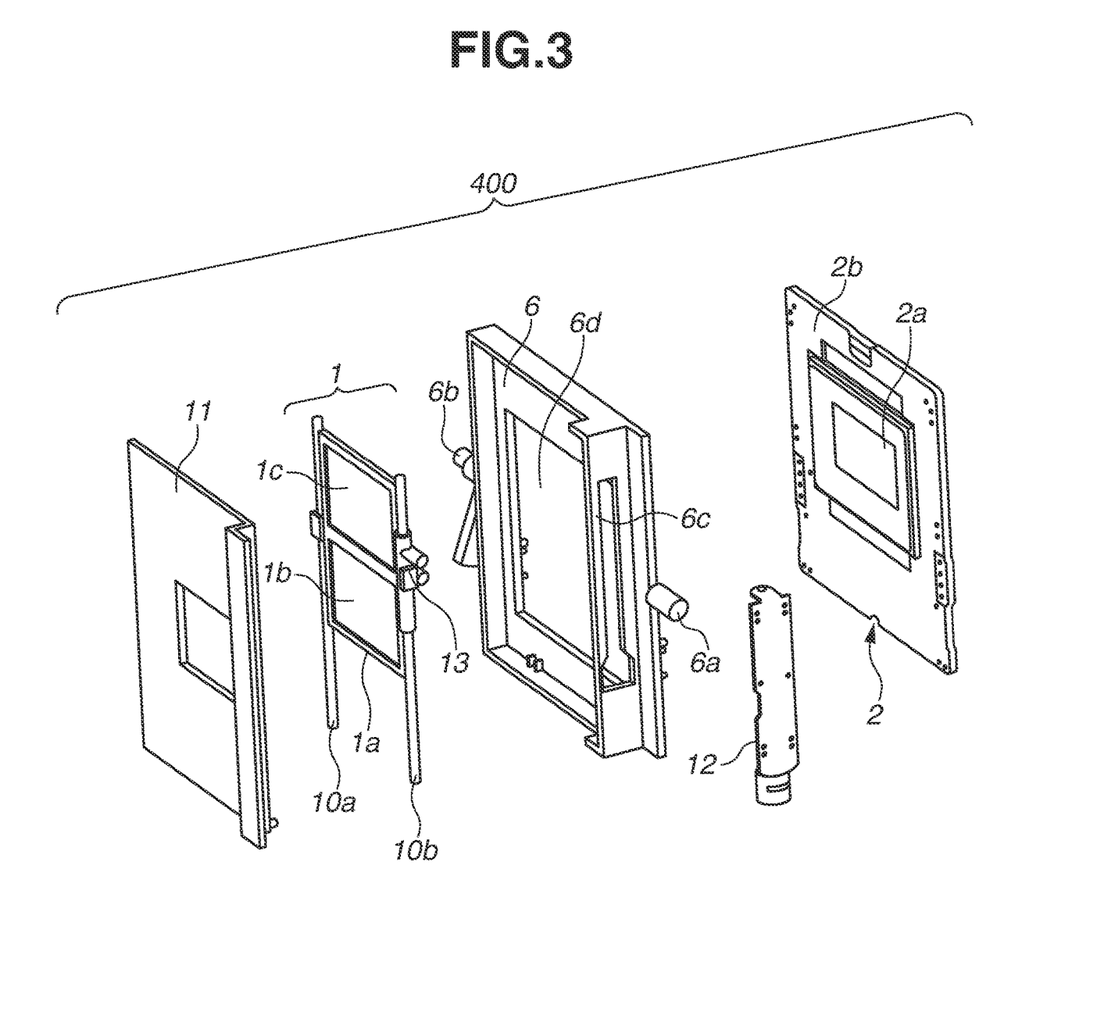
FIG. 3 is an exploded perspective view of a unit according to the first exemplary embodiment.

FIG. 1A is a perspective view of a monitoring camera according to a first exemplary embodiment, and FIG. 1B is a cross-sectional view of the monitoring camera according to the first exemplary embodiment. FIGS. 2A and 2B are exploded perspective views of a camera main body as viewed from different directions. FIG. 3 is an exploded perspective view of a unit according to the first exemplary embodiment.

A monitoring camera 100 includes a lens barrel 200 having a lens group, and a camera main body 300 as an example of an image pickup device.

The lens barrel 200 holds a lens 200a and a lens 200b as image pickup lenses. The lens 200a and the lens 200b cause a light beam incident from an object side to form an image on an image pickup element. The camera main body 300 includes a case 4, and a unit 400 having, for example, the image pickup element.

The case 4, which has an approximately rectangular shape, supports the unit 400 in a rotationally movable manner. The lens barrel 200 is fixed to the case 4. The unit 400 includes a base member 6 as a support member, an optical filter unit 1, and an image pickup element unit 2. The unit 400 is configured to be rotationally moved by an input of driving from a stepping motor 9 as a first drive member.

The base member 6 supports the optical filter unit 1 and the image pickup element unit 2. The base member 6 includes rotary shafts 6a and 6b serving as rotation shafts which extend in a Z axis direction (extending direction). The case 4 includes hole portions 4a and 4b, and the rotary shaft 6a of the base member 6 is inserted into the hole portion 4a through a bearing 7a. The rotary shaft 6b of the base member 6 is inserted into the hole portion 4b through a bearing 7b and a bearing member 8 through which the bearing 7b is inserted. Thus, the base member 6 is rotatably held to the case 4. A rotational center of the base member 6 is the rotary shafts 6a and 6b, and a center of the image pickup element (a center on X and Y planes in FIGS. 2A and 2B) is on the rotary shafts 6a and 6b (on the Z axis in FIGS. 2A and 2B). Thus, even if the base member 6 rotates, the center of the image pickup element unit 2 does not move in a Y direction. A photo-interrupter (not illustrated) serving as a detection member is disposed on a moving area of the base member 6, and a position of the base member 6 is determined by an output from the photo-interrupter (not illustrated) and a number of driving pulses of the stepping motor 9. In more detail, the photo-interrupter defines an origin of the base member 6 (a position where the base member 6 does not rotationally move). When the stepping motor 9 rotates in a forward direction, the number of pulses is counted as a pulse value, and when the stepping motor 9 rotates in a reverse direction, the number of pulses is counted as a minus value.

The optical filter unit 1 includes an optical filter holding member 1a serving as an optical filter holder, an infrared cut filter 1b, dummy glass 1c, and a stepping motor 12. The infrared cut filter 1b is used for cutting infrared light. The dummy glass 1c is inserted into an optical path instead of the infrared cut filter 1b when the infrared cut filter 1b is extracted from the optical path, and is used for correcting a length of the optical path. An image capturing mode includes a day mode and a night mode. In the day mode, in a case where color reproducibility of an object is prioritized, the infrared cut filter 1b is inserted into the optical path so as to prevent infrared light from entering the image pickup element so that an image is captured. On the other hand, in the night mode where, an image is captured in low-illuminance state under a dark environment, the infrared cut filter 1b is extracted from the optical path so that an image is captured by letting in not only visible light but also infrared light to the image pickup element for improving an object recognition property. The insertion and extraction of the infrared cut filter 1b into and from the optical path enable switching between day mode image capturing and night mode image capturing. That is, the infrared cut filter 1b and the dummy glass 1c are extractable from the optical path.

The photo-interrupter (not illustrated) is disposed on a moving area where the optical filter unit 1 is inserted or extracted, and the position of the optical filter unit 1 is determined by an output from the photo-interrupter (not illustrated) and a number of driving pulses of the stepping motor 12.

The stepping motor 12 serving as a second drive member inserts the infrared cut filter 1b into the optical path in the day mode, and extracts the infrared cut filter 1b from the optical path in the night mode to insert the dummy glass 1c into the optical path. The stepping motor 12 is fixed to a hole portion 6c of the base member 6 by a screw, not illustrated. The stepping motor 12 is connected to a flexible printed circuit board, not illustrated.

The optical filter holding member 1a holds the infrared cut filter 1b and the dummy glass 1c. The optical filter holding member 1a is movably held in a direction approximately vertical to the optical axis by guide bars 10a and 10b fixed to the base member 6. The guide bars 10a and 10b are engaged with hole portions of the optical filter holding member 1a, so that rotation of the optical filter holding member 1a about the guide bars 10a and 10b is restricted. A rack 13 is fixed to the optical filter holding member 1a with the rack 13 being biased in an axial direction vertical to the optical axis and in a rotational direction by a rack spring (not illustrated), and is engaged with a screw portion of the stepping motor 12. The rack 13 is moved together with the optical filter holding member 1a in a direction approximately vertical to the optical axis by rotation of the screw portion. The guide bars 10a and 10b are fixed as being sandwiched between a retaining member 11 and the base member 6.

The image pickup element unit 2 includes an image pickup element 2a, and an image pickup element holder 2b which holds the image pickup element 2a. The image pickup element 2a converts an image obtained through an image pickup lens into an electrical signal. The image pickup element holder 2b is disposed so that the image pickup element 2a is inserted into a hole portion 6d provided to the base member 6, and is fixed by the base member 6 and a screw, not illustrated.

Figure 4:
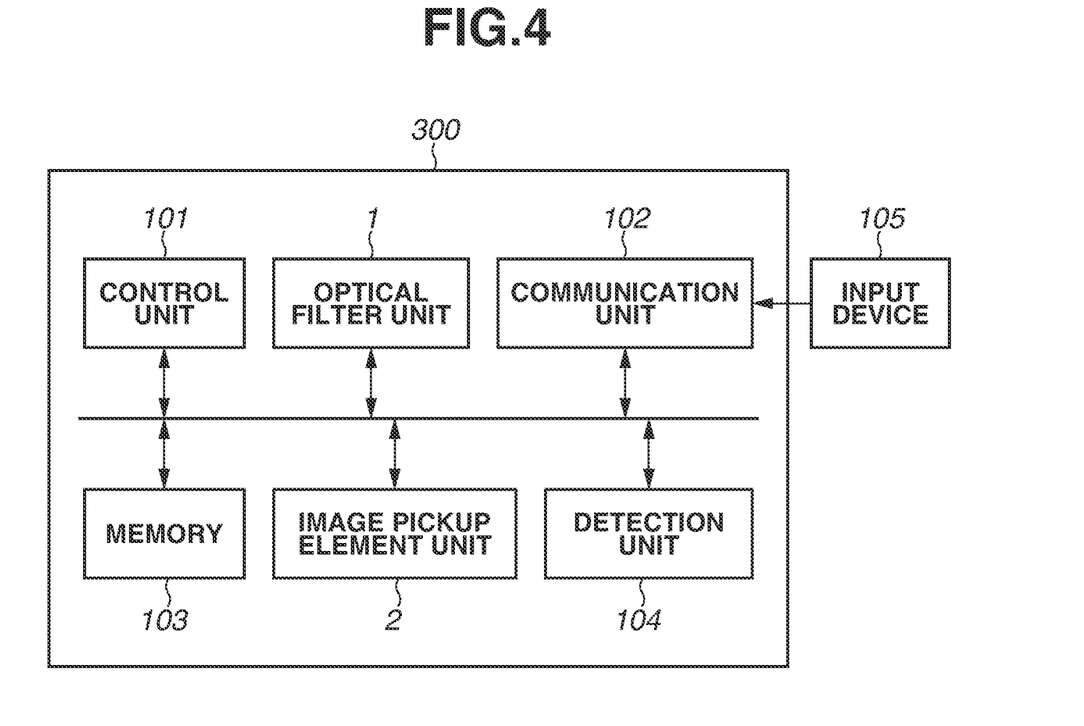
FIG. 4 is a diagram illustrating an example of a functional configuration of an image pickup device according to the first exemplary embodiment.

FIG. 4 is a diagram illustrating an example of a functional configuration of the image pickup device according to the first exemplary embodiment. The camera main body 300 serving as the image pickup device further includes a control unit 101, a communication unit 102, a memory 103, and a detection unit 104. The control unit 101 controls operations of the optical filter unit 1 and the image pickup element unit 2. The communication unit 102 accepts an input from a user through an input device 105. Herein, the user inputs an instruction for rotating the image pickup element unit 2. For example, while checking a picked-up image, the user gradually and rotationally moves the image pickup element 2a, and thus adjusts the image pickup element 2a so that an object desired to be viewed comes within a depth of field. The detection unit 104 detects a number of driving pulses of the stepping motors 9 and 12 in the optical filter unit 1 and the image pickup element unit 2, respectively. The memory 103 stores the number of driving pulses detected by the detection unit 104 and a distance X1 between the rotational center position of the image pickup element unit 2 and a center position O1 of the optical filter unit 1.

Figure 5A:
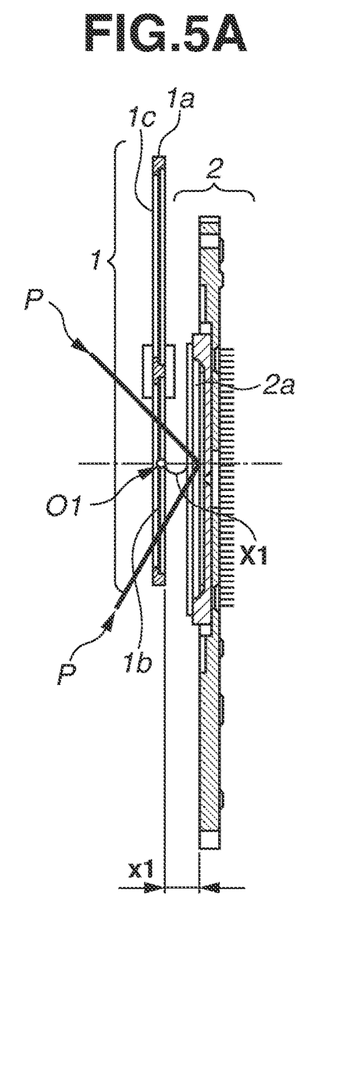
FIGS. 5A, 5B, and 5C are diagrams respectively illustrating an image pickup element unit and an optical filter unit according to the first exemplary embodiment.
Figure 5B:
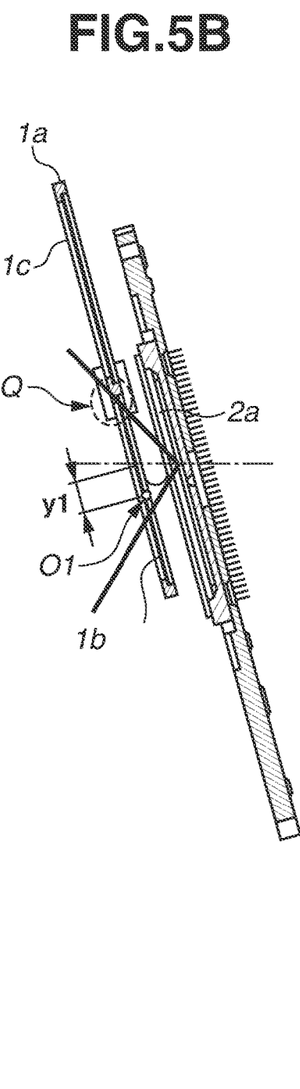
Figure 5C:
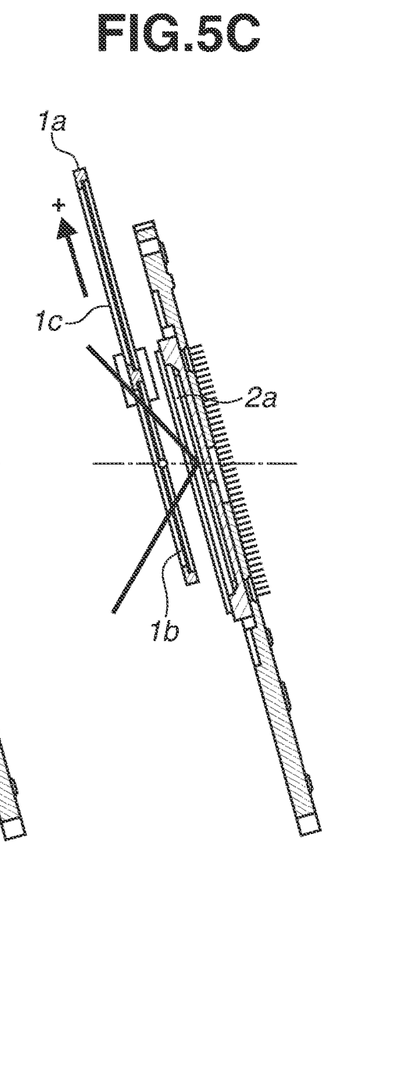

A case where the image pickup element unit 2 and the optical filter unit 1 are rotated from a state of FIG. 5A to a state of FIG. 5B will be described. FIGS. 5A to 5C are diagrams illustrating the image pickup element unit 2 and the optical filter unit 1 according to the first exemplary embodiment. A counterclockwise direction is a plus (+) direction, and a clockwise direction is a minus (−) direction. The image pickup element unit 2 and the optical filter unit 1, which are not rotated as illustrated in FIG. 5A, namely, are in a state that a rotation angle is 0°, are rotated in the plus direction by 0°, and thus they are in the state of FIG. 5B. At this time, the rotational center position of the image pickup element unit 2 is on the rotary shafts 6a and 6b, and thus, the rotational center position is on the optical axis even after such rotation. On the other hand, the center position O1 of the optical filter unit 1 disposed on a position separated by the distance X1 from the rotational center position of the image pickup element unit 2 is not on the optical axis. For this reason, in the state of FIG. 5B, a light beam P focused by the lens is blocked by a frame portion of the optical filter unit 1 (area Q). In order to address the issue, the optical filter unit 1 is moved in an extractable direction as described below.

Figure 6:
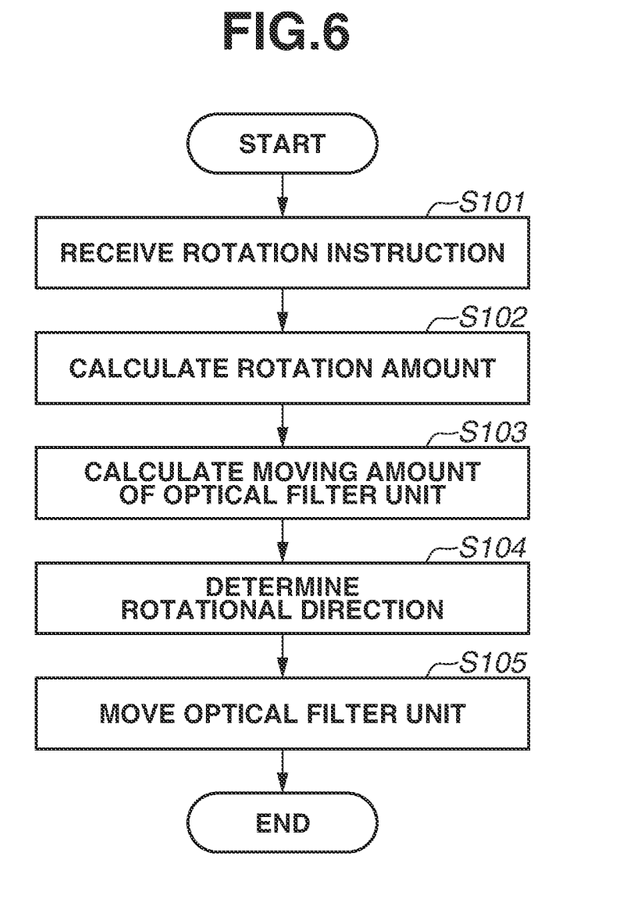
FIG. 6 is a flowchart illustrating an example of movement processing of the optical filter unit according to the first exemplary embodiment.

FIG. 6 is a flowchart illustrating movement processing of the optical filter unit 1. In step S101, in a case where the communication unit 102 receives an instruction for rotating the image pickup element unit 2 and the optical filter unit 1 from the input device 105, the processing proceeds to step S102. In step S102, the control unit 101 calculates a rotation angle θ based on the number of driving pulses of the stepping motor 9. In step S103, the control unit 101 calculates an amount y1 by which the optical filter unit 1 should move, based on the rotation angle θ in order to determine a moving amount of the optical filter unit 1 in the extractable direction. As illustrated in FIG. 5B, the amount of shift y1 of the rotational center position of the optical filter unit 1 is obtained as the amount y1=X1×tan θ, by which the optical filter unit 1 should move, based on the distance X1 and the rotation angle θ. In step S104, a rotational direction is determined based on the number of driving pulses. Specifically, the number of pulses is counted as a plus value when the stepping motor 9 rotates in the forward direction, and the number of pulses is counted as a minus value when the stepping motor 9 rotates in the reverse direction. In such a manner, the rotational direction is determined.

In a case where the rotational direction is the plus direction, as illustrated in FIG. 5C, the optical filter unit 1 is moved upward by the amount y1. Similarly, in a case where the rotational direction is the minus direction, the optical filter unit 1 is moved downward by the amount y1.

As described above, the optical filter unit 1 and the image pickup element unit 2 are held by the base member 6, and when the base member 6 rotationally moves, both the optical filter unit 1 and the image pickup element unit 2 rotationally move in the identical direction. Thus, in the configuration having the optical filter unit 1 and the image pickup element unit 2, a tilt amount (rotation amount) of the image pickup element 2a can be sufficiently secured. When the optical filter unit 1 and the image pickup element unit 2 rotationally move, a light beam can be inhibited from being blocked by adjusting the position of the optical filter unit 1.

Figure 7:
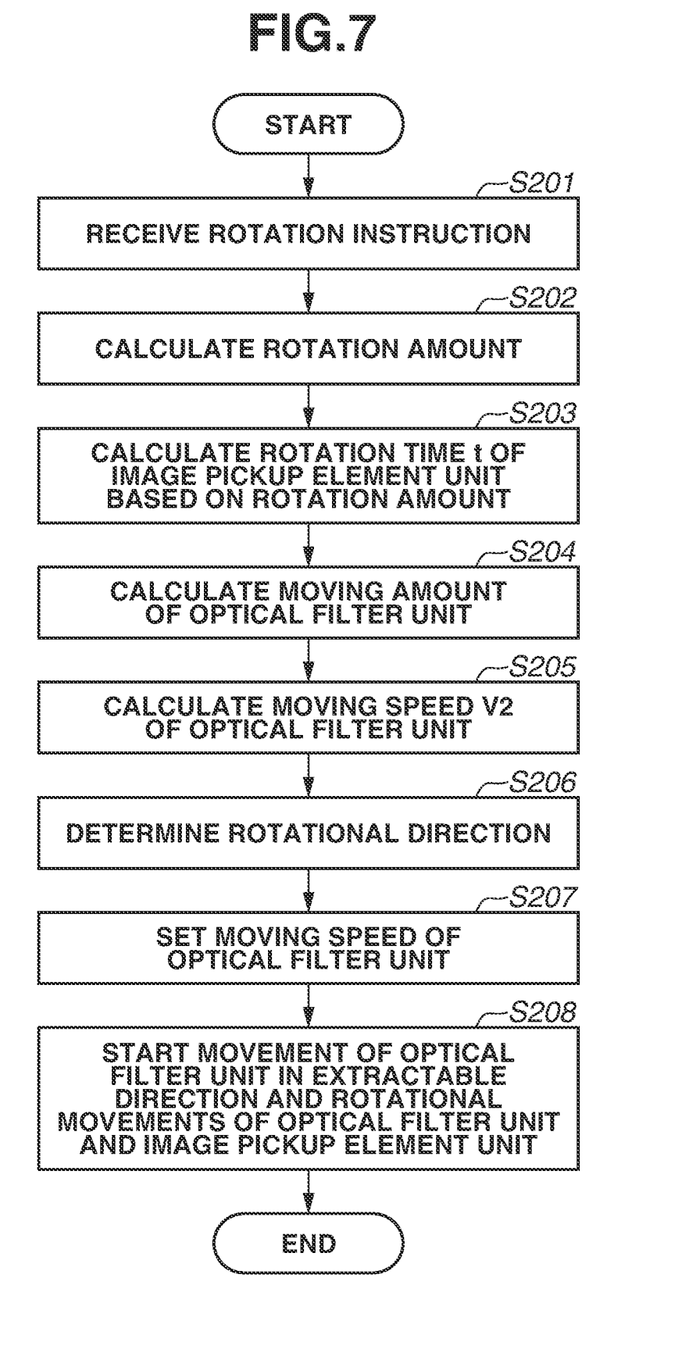
FIG. 7 is a flowchart illustrating an example of movement processing of the optical filter unit according to a second exemplary embodiment.

A second exemplary embodiment will be descried. FIG. 7 is a flowchart illustrating movement processing of the optical filter unit 1 according to the second exemplary embodiment. The memory 103 according to the second exemplary embodiment stores a rotational speed V1 of the image pickup element unit 2.

In step S201, in a case where the communication unit 102 receives an instruction for rotating the image pickup element unit 2 and the optical filter unit 1 from the input device 105, the processing proceeds to step S202. In step S202, the control unit 101 calculates the rotation angle θ based on a number of driving pulses of the stepping motor 9.

In step S203, the control unit 101 calculates a time T during which the image pickup element unit 2 moves to a target position, based on the calculated rotation angle θ and the rotational speed V1 of the image pickup element unit 2. The rotational speed V1 is stored in the memory 103. In step S204, the control unit 101 calculates an amount y1 by which the optical filter unit 1 should move, based on the rotation angle θ. The shift mount y1 of the rotational center position of the optical filter unit 1 illustrated in FIG. 5B is the amount y1=X1×tan θ by which the optical filter unit 1 should move, based on the distance X1 and the rotation angle θ. In step S205, the control unit 101 calculates a moving speed V2 (=y1/T) of the optical filter unit 1 in the extractable direction based on the amount y1 by which the optical filter unit 1 should move and the time T during which the image pickup element unit 2 moves to a target position.

In step S206, a rotational direction is determined based on a number of driving pulses. Specifically, the number of pulses is counted as a plus (+) value when the stepping motor 9 rotates in the forward direction, and the number of pulses is counted as a minus value when the stepping motor 9 rotates in the reverse direction. In such a manner, the rotational direction is determined. In a case where the rotational direction is the plus direction, in step S207, the optical filter unit 1 is set to be moved upward by the amount y1 at the moving speed V2 or more. Similarly, in a case where the rotational direction is the minus direction, in step S207, the optical filter unit 1 is set to be moved downward by the amount y1 at the moving speed V2 or more. In step S208, the rotational movements of the image pickup element unit 2 and the optical filter unit 1 and the movement of the optical filter unit 1 in the extractable direction start simultaneously.

As described above, at the moving speed V2 of the optical filter unit 1, the movement of the optical filter unit 1 in the extractable direction completes within the time T during which the image pickup element unit 2 moves to a target position. That is, the movement of the optical filter unit 1 in the extractable direction completes until the rotational movement of the base member 6 completes.

Thus, during the rotational movements of the image pickup element unit 2 and the optical filter unit 1, a light beam can be inhibited from being shaded by the optical filter holding member 1a.

A third exemplary embodiment will be described. In the above-described exemplary embodiments, when the image pickup element unit 2 and the optical filter unit 1 are rotationally moved, the optical filter is moved in a y direction regardless of a size of the rotation angle θ. In the third exemplary embodiment, however, in a case where the rotation angle θ is a predetermined value or less, the optical filter is not moved to the y direction. That is, in a case where the rotation angle θ is set so that a light beam is shaded by the optical filter holding member 1a, the optical filter may be moved in the y direction. Thus, the movement of the optical filter in the y direction can be kept to a minimum.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-174917, filed Sep. 19, 2018, and No. 2019-091386, filed May 14, 2019, which are hereby incorporated by reference herein in their entirety.

What is claimed is:

1. An image pickup device comprising:
an image pickup element configured to be rotationally movable with respect to a plane orthogonal to an optical axis of an image pickup lens;
an optical filter configured to be able to be inserted into and removed from the optical axis of the image pickup lens,
wherein the optical filter rotationally moves along with a rotational movement of the image pickup element in a direction identical to a direction of the rotational movement of the image pickup element,
wherein a moving amount of the optical filter in an insertion and removal direction is determined based on a rotation amount of the image pickup element.

2. The image pickup device according to claim 1, further comprising:
an image pickup element holder configured to support the image pickup element,
an optical filter holder configured to support the optical filter;
a support member configured to support the image pickup element holder and the optical filter holder; and a first drive motor configured to rotationally move the support member with respect to the plane orthogonal to the optical axis of the image pickup lens.

3. The image pickup device according to claim 2, wherein the support member includes a rotation shaft, wherein the insertion and removal direction of the optical filter is different from an extending direction of the rotation shaft.

4. The image pickup device according to claim 1, further comprising a second drive motor configured to insert and remove the optical filter into and from the optical axis of the image pickup lens.

5. The image pickup device according to claim 1, further comprising
a hardware processor; and
a memory for storing instructions to be executed by the hardware processor, wherein, when the instructions stored in the memory are executed by the hardware processor, the image pickup device functions as:

a determination unit configured to determine a rotation amount of the image pickup element,
wherein a moving amount of the optical filter in the insertion and removal direction is determined based on the rotation amount of the image pickup element determined by the determination unit.

6. The image pickup device according to claim 5, wherein, in a case where the rotation amount of the image pickup element is a predetermined value or less, the optical filter does not move in the insertion and removal direction.

7. The image pickup device according to claim 1, wherein the movement of the optical filter in the insertion and removal direction completes until the rotational movement of the optical filter completes.

8. The image pickup device according to claim 1, wherein the optical filter is an infrared cut filter.

* * * * *